United States Patent [19]
Schultheis et al.

[11] Patent Number: 5,831,569
[45] Date of Patent: Nov. 3, 1998

[54] METHOD AND APPARATUS FOR INJECTING SYNTHETIC PULSES FOR INCREASED TRANSMITTER STABILITY

[75] Inventors: David M. Schultheis, Columbia; George R. Vaughan, Linthicum; Robert R. Barron, Woodstock, all of Md.

[73] Assignee: Northrop Grumman Corporation, Los Angeles, Calif.

[21] Appl. No.: 742,303

[22] Filed: Nov. 1, 1996

[51] Int. Cl.⁶ ........................................ G01S 7/282
[52] U.S. Cl. .............................. 342/88; 342/204
[58] Field of Search ................ 342/168, 88, 203, 342/204, 174

[56] References Cited

U.S. PATENT DOCUMENTS

| | | | |
|---|---|---|---|
| 3,703,005 | 11/1972 | Herman et al. | 372/34 |
| 4,117,355 | 9/1978 | Fleischer | 307/310 |
| 4,445,096 | 4/1984 | Lee et al. | 331/107 DP |
| 5,049,889 | 9/1991 | Hol et al. | 342/160 |
| 5,103,453 | 4/1992 | Kebabian et al. | 372/20 |
| 5,278,567 | 1/1994 | Nourrcier | 342/202 |
| 5,309,458 | 5/1994 | Carl | 372/34 |
| 5,400,351 | 3/1995 | Montgomery et al. | 372/34 |

OTHER PUBLICATIONS

Robert Barron and David Schultheis, "The ARSR–4 High Fidelity Solid State Radar Transmitter" IEEE MTT–S, International Microware Symposium, May 23–37, 1994.

*Primary Examiner*—Charles Jordan
*Assistant Examiner*—Christopher K. Montgomery
*Attorney, Agent, or Firm*—Walter G. Sutcliff

[57] ABSTRACT

An apparatus and method for improving stability in a transmitter receiving a staggered pulse train includes maintaining a constant temperature of the transmitter at the start of each pulse of the pulse train. Such maintenance may be accomplished by inserting "false", "phantom" or "synthetic" pulses into the pulse train. These pulses may be inserted between pulses, prior to a cooler pulse, or after a hotter pulse. The inserted pulses are then gated out prior to the final RF transmission.

8 Claims, 5 Drawing Sheets us,569

METHOD AND APPARATUS FOR INJECTING SYNTHETIC PULSES FOR INCREASED TRANSMITTER STABILITY

BACKGROUND OF THE INVENTION

1. Field of the Invention

The invention is directed to a technique for improving stability and solid state radar transmitters which have significant pulse repetition frequency stagger ratios. The present invention corrects for pulse to pulse differences, e.g., thermal et al., associated with the radio frequency power transistors.

2. Description of the Related Art

Current surveillance radar system requirements dictate moving target indicator (MTI) improvement factors of greater than 65 dB. In order to achieve this, the radar subsystems must have stability limits of typically 70 dB or greater. One key subsystem limitation is the transmitter. State of the art solid state transmitters can achieve stability well in access of 70 dB when operating at fixed pulse repetition frequency (PRF). However, as the PRF is varied, the transmitter stability degrades due to transient differences pulse to pulse. Radar systems need to include PRF stagger to resolve target ambiguities, in either range or doppler.

FIG. 1a shows a simplified block diagram of a modern solid state radar state transmitter. The input RF signal from the frequency generator 10 is amplified by 50 or 60 dB in the preamplifier 12. The output of the preamplifier 12 is fed to a driver 14, which has additional 10 to 15 dB of gain. The output of the driver 14 is then split by a splitter 16 and fed via RF gating switches 18 to parallel output amplifiers 20 of the transmitter. The output amplifiers 20 also have 10 to 15 dB of gain. The input signal to each output amplifier 20 is gated for pulse shaping and spectrum control via the gates 18.

Highly regulated power supplies 22 provide the DC input to the RF amplifiers 12, 14 and 20. Typical pulse to pulse voltage regulation is between two and three mV on the approximately 40 V DC line. This degree of regulation is necessary to avoid introducing pulse to pulse phase and amplitude modulation due to voltage differences. The two to three mV regulation is sufficient to achieve over 75 dB MTI limitation. In practice, MTI limitations in excess of 70 dB are achieved when operating the transmitter at a fixed PRF. In contrast, when operating in a staggered PRF mode, the stability has been found to degrade by 10 dB or more, although the power supply regulation of the power supply 22 remains in the two to three mV region.

SUMMARY OF THE INVENTION

It is an object of the present invention to obtain a stable output when operating the transmitter in a staggered PRF mode.

An additional object of the invention is to provide stability during staggered mode operation in a flexible, practical manner.

These and other objects of the present invention may be realized by providing a transmitter including an amplifier stage receiving a staggered pulse train and a unit which maintains a constant temperature at a start of each pulse in the pulse train. The unit includes an insertion device which inserts at least one of a false pulse between staggered pulses of the pulse train, a false pulse before each cooler pulse in the pulse train, and a false pulse after a hotter pulse in the pulse train. The transmitter advantageously includes gates which eliminate the inserted false pulses from the pulse train output by the transmitter.

These and other objects of the present invention may also be realized by providing a method for increasing stability of a transmitter operating in a staggered PRF mode, including amplifying a staggered pulse train and maintaining a constant starting temperature of each pulse in the pulse train. The maintaining step may include inserting at least one of a false pulse between staggered pulses in the pulse train, a false pulse before each cooler pulse in the pulse train, and a false pulse after each hotter pulse in the pulse train. The method advantageously includes gating out the inserted false pulses prior to outputting the pulse train from the transmitter.

These and other objects of the invention will become more readily apparent from detailed description given herein. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limited to the present invention and wherein:

FIG. 1b is a transistor thermal model of a simplified electrical circuit equivalent to the transmitter shown in FIG. 1a;

FIG. 4a illustrates the transistor thermal response of the pulse pattern shown in FIG. 3a;

DETAILED DESCRIPTION OF THE PREFERRED EMBODIMENTS

Once it was determined that the power supply itself was not the cause of the instability during staggered pulses, the source of the instability needed to be determined. The principal cause of the instability was traced to transient temperature differences in the RF power transistors which make up the RF amplifiers. The transistor thermal impedance consists of thermal resistances and thermal capacitances of the various materials which make up the transistors. When the RF signal is applied to the transistors, the transistors heat up according to an exponential function.

Figure 1A:
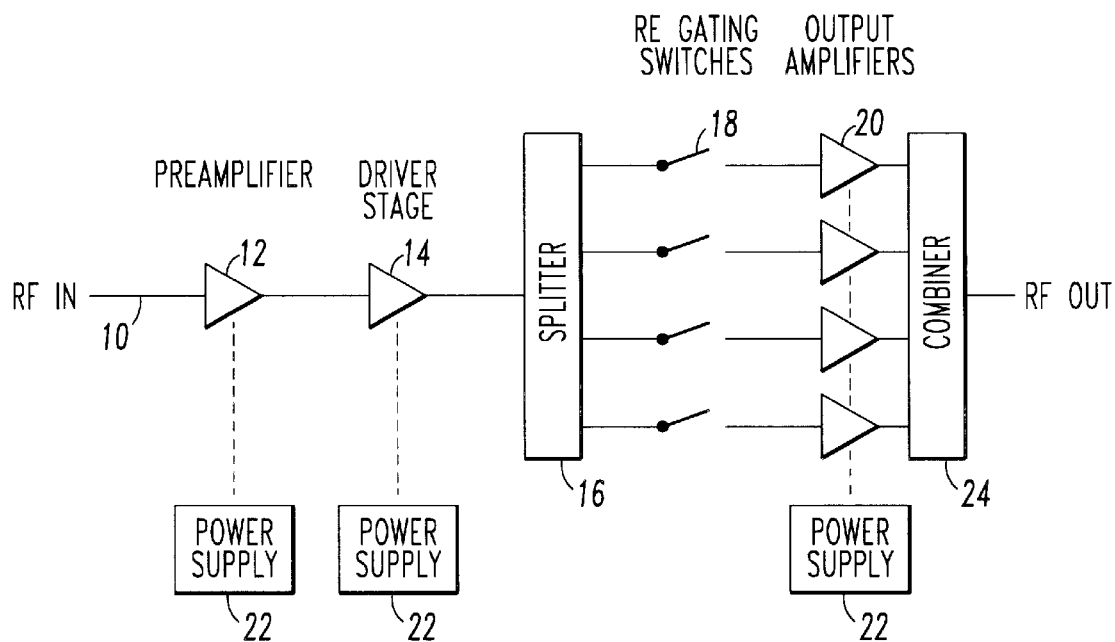
FIG. 1a is a block diagram of a simplified solid state transmitter.
Figure 1B:
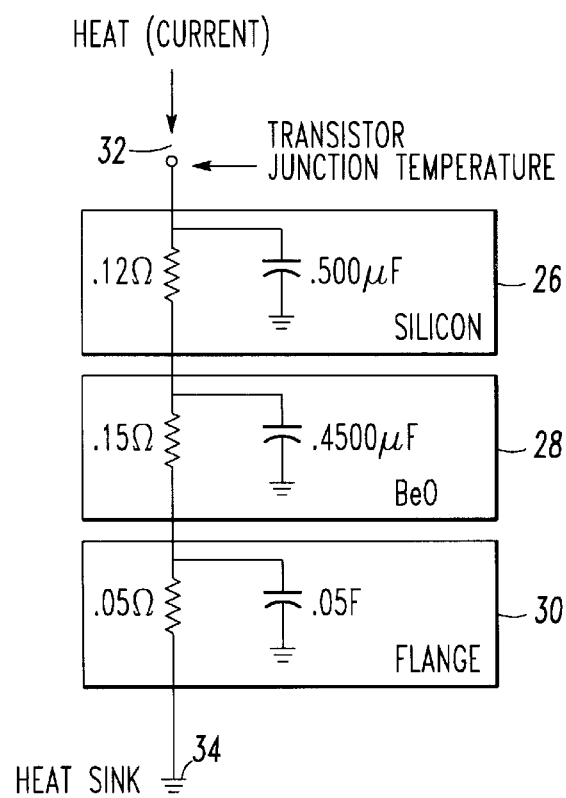

A simplified electrical equivalent circuit model used to describe the transistor thermal responses is shown in FIG. 1b. The major thermal resistances and capacitances in the transistor are in the semiconductor material 26, e.g., silicon, the substrate 28, e.g., beryllium oxide on which the semiconductor material resides, and the metal flange 30, typically, elkonite or copper. Typical resistances and capacitances for each of these materials is shown in FIG. 1b, where the semiconductor material 26 has a thermal resistance of 0.12 Ω and a thermal capacitance of 500 μF, the substrate 28 has a thermal resistance of 0.15 Ω and a thermal capacitance of 4500 μF, and the flange 30 has a resistance of 0.05 Ω and a thermal capacitance of 0.05 F. A transistor junction 32 above the semiconductor material 26 and a heat sink 34 below the flange 30 are also indicated in FIG. 1b.

Figure 2A:
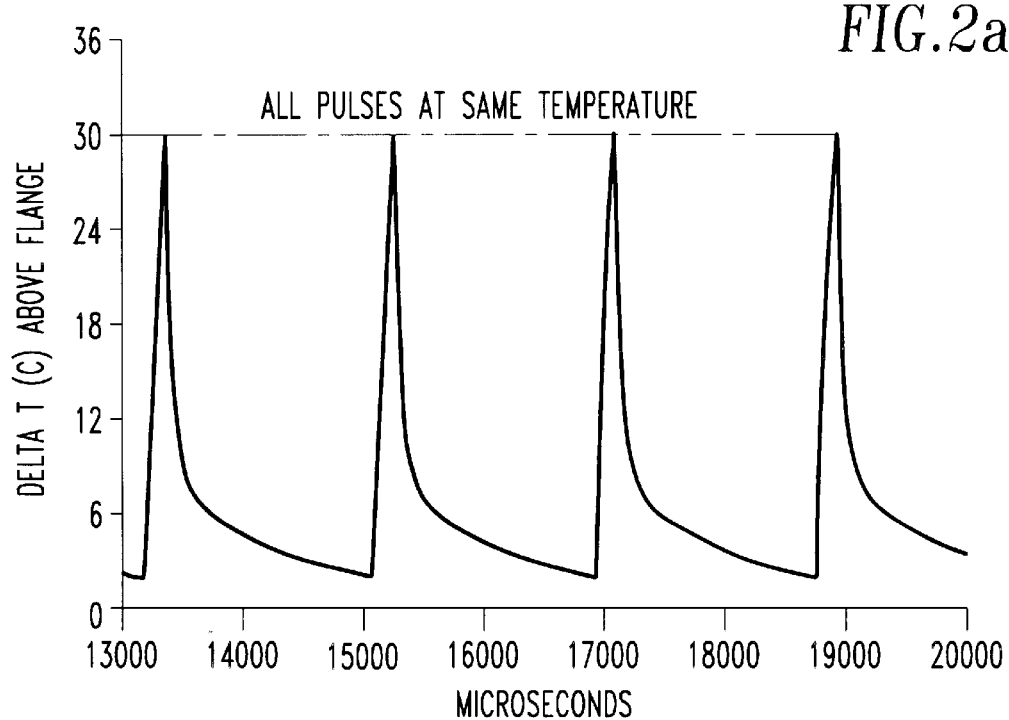
FIG. 2a shows the thermal response of a 220 watt RF transistor in a fixed PRF mode.
Figure 2B:
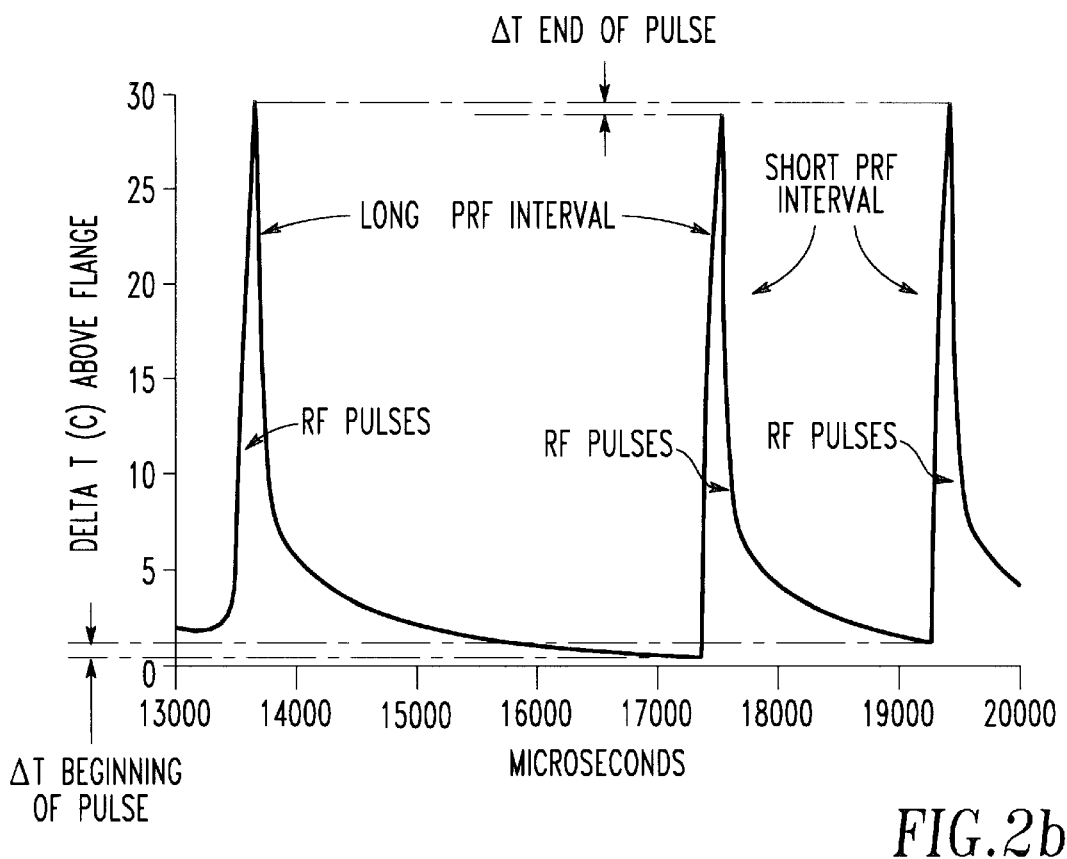
FIG. 2b shows the thermal response for a 220 watt RF transistor in a staggered PRF mode.
Figure 2C:
FIG. 2c illustrates the staggered PRF pulse pattern for the response shown in FIG. 2b.

As shown in FIG. 2a, when operating in a fixed PRF mode, the transistor junction 32 reaches the same temperature on every pulse once the temperature of the metal flange 30 has settled to its steady state value. However, as shown in FIG. 2b, under staggered PRF conditions, the transistor junction 32 temperature never reaches the steady state value. Rather, this temperature varies due to the different time periods since the previous pulse, as evidenced by ΔT both at the beginning and the end of adjacent pulses after a long PRF interval. The pulse used to generate FIG. 2b is shown in FIG. 2c.

Junction temperature differences of over 1° C. can occur during normal operating conditions. These temperature differences lead to electrical phase and amplitude differences on a pulse to pulse basis, thereby limiting the radar MTI improvement factor. The phase stability limitation is typically 10 dB worse than the amplitude limitation. A temperature difference of 1° C. translates to approximately 0.05 electrical degrees or 0.00087 radians. Since the MTI improvement factor limitation is 20 times log Δθ (phase difference in radians), a 1° C. temperature difference translates into a 61 dB MTI performance limit.

In order to compensate for some of these variations, as well as any other variations arising in the operation of the transistors, the present invention injects extra RF pulses in the lower level amplifier stages, e.g., prior to the splitter 16, of the transmitter. These pulses are then gated out at the final output amplifier so as to not transmit any unwanted pulses and disturb the radar system.

In a solid state transmitter system such as depicted in FIG. 1a, the stability limitation comes first from the preamplifier 12, then from the driver 14, and finally from the output amplifiers 20. The transmitter high power stages are formed by summing the power contribution of many unmatched transistors operating in quadrature. Individual transistor anomalies tend to average. Unfortunately, this is not true of the low power level preamplifier stage. Therefore, the present invention corrects the pulse to pulse stability limits in the preamplifier 12 and the driver 14 under the staggered PRF conditions.

Figure 3A:
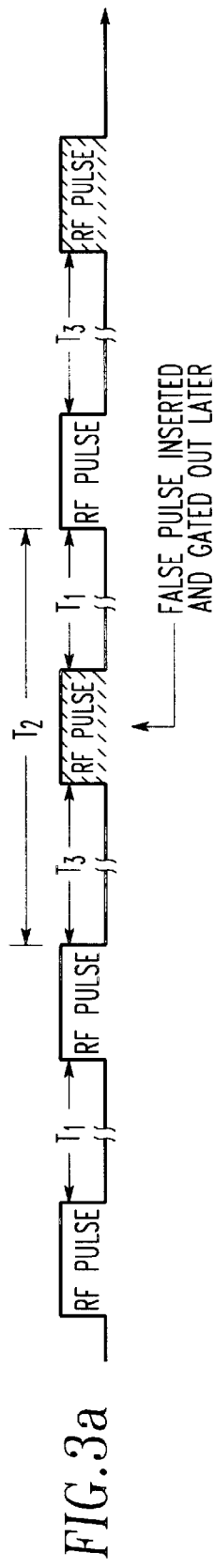
FIG. 3a illustrates a false pulse insertion of the present invention in the middle of the long PRF interval.
Figure 3B:
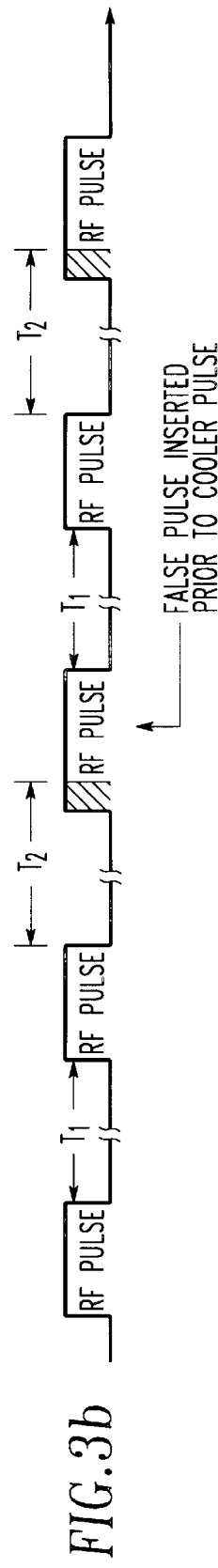
FIG. 3b illustrates a false pulse insertion of the present invention prior to a cooler pulse.
Figure 3C:
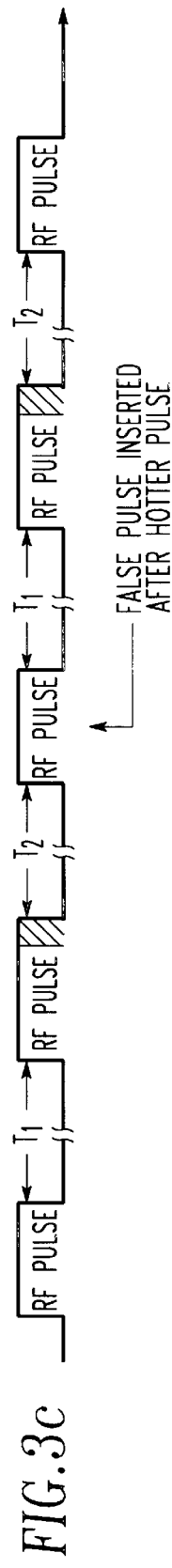
FIG. 3c illustrates a false pulse insertion of the present invention after a hotter pulse.

The additional pulses can be introduced into the system in three different manners, as shown in FIGS. 3a through 3c. The most straight forward implementation is to insert one additional pulse approximately in the middle of the long PRF interpulse period, e.g., in the case of a 2:1 stagger ratio, as shown in FIG. 3a.

Alternatively, the pulse following the long PRF can be preheated with RF before the actual RF pulse occurs, as shown in FIG. 3b. The pre-heat portion of the pulse would still be gated out in the transmitter output stage.

A third option is to lengthen the pulse preceding the long PRF as shown in FIG. 3c. Again, the portion of the pulse beyond the normal length would be gated out in the transmitter output stage.

The choice of the false pulse implementation shown in FIGS. 3a through 3c depends largely on the particular radar system application. The first technique shown in FIG. 3a apparently works best for relatively long, i.e., greater than 100 microsecond, systems which operate at a duty cycle of less than 10%. For systems using shorter pulse lengths, the pulse lengthening approach, i.e., gating either before or after the desired pulse, may be more readily implemented.

Figure 4A:
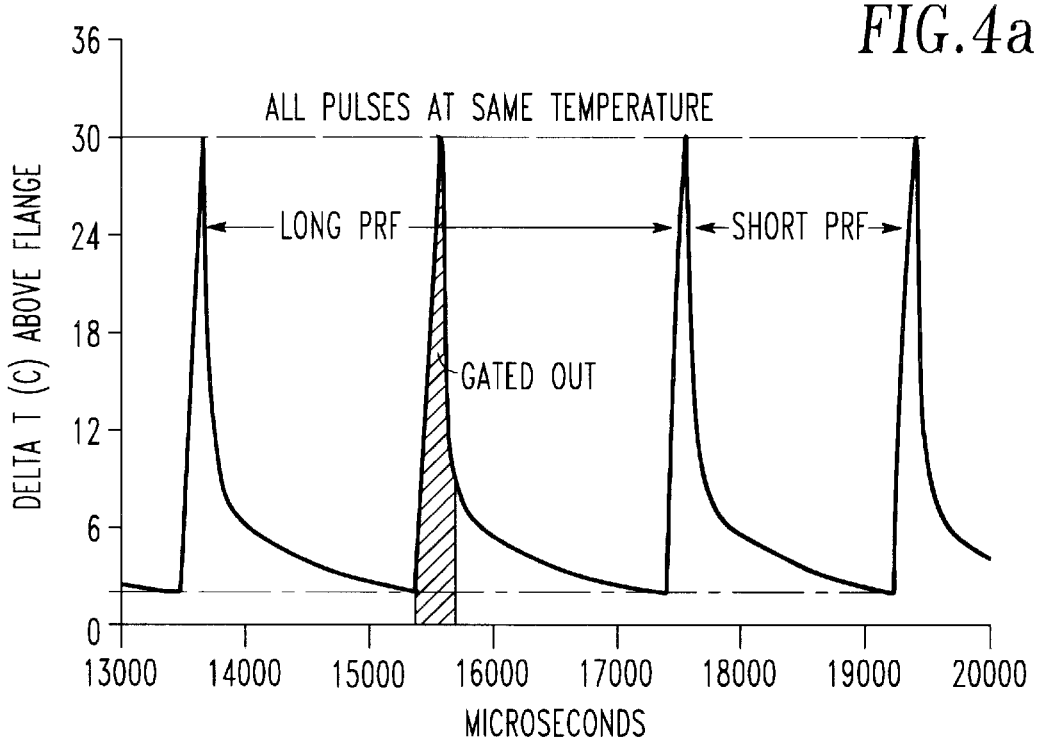

FIG. 4a shows a plot in the transistor temperature response using the technique shown in FIG. 3a. The pulse conditions are taken directly from the air route surveillance radar, version four (ARSR-4) solid state transmitter requirements. The pulse conditions are the same as shown in FIG. 2b, except that the false RF pulse has been inserted approximately in the middle of the long PRF interpulse. The hatched portions indicate the portions of the pulse which are eliminated at the actual output. The use of the false pulse insertion technique reduces the pulse to pulse temperature differences to less than one-fifth of their original value. This translates to a 10 dB stability improvement.

Figure 4B:
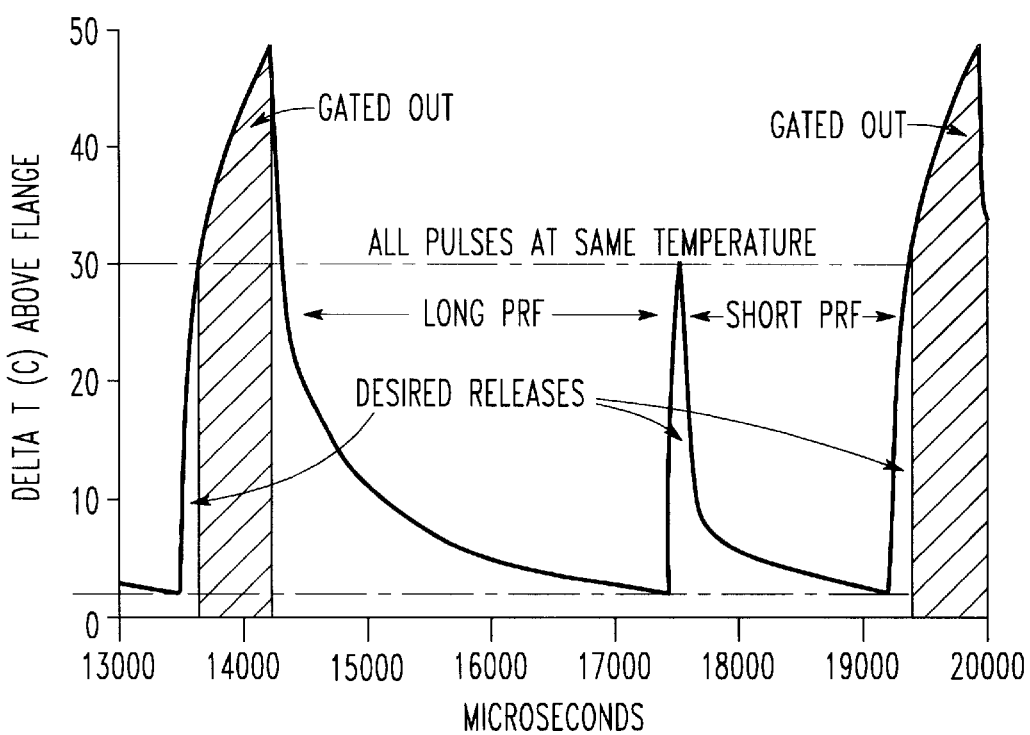
FIG. 4b illustrates the transistor thermal response of the pulse pattern shown in FIG. 3c.

FIG. 4b shows the results of the transistor temperature responses using the technique from FIG. 3c, with the extension of the hotter pulse. Again, the hatched portions indicate the portions of the pulse which are eliminated at the actual output. In the case of the ARSR-4 pulse conditions, the hotter pulse must be lengthened from 150 microseconds to 700 microseconds to equalize the temperature of the cooler pulse. This pulse lengthening is excessive and is required because of the exponential nature of the thermal RC time constant. In shorter pulse systems, where the thermal RC time constant is significantly longer than the pulse width, this approach is believed to be more desirable.

In implementing the above techniques, the response of the transistor needs to be measured and the characteristics of the system need to be known. From this information, the pulse form required can be determined in order to equalize the conditions at the start of each pulse, i.e., the temperature is the same at the start of every new pulse. The inserted pulses may be gated anywhere prior to the actual transmission. However, it is preferable that the inserted pulse go through every amplifying source.

Figure 5:
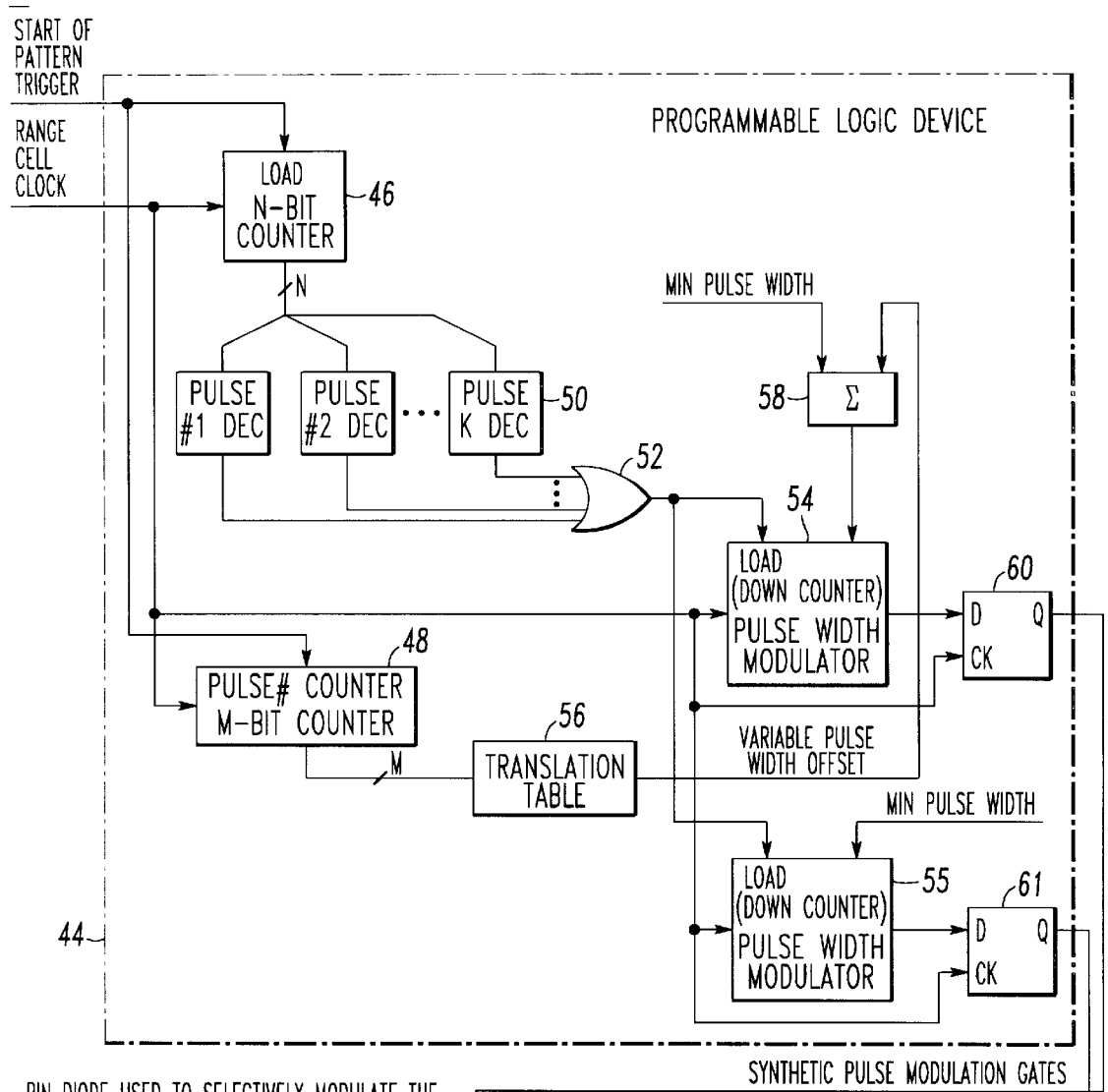
FIG. 5 illustrates a schematic of the configuration of the present invention which adds a variable amount of additional RF at the end of each pulse of the coherent processing interval.

An example of a configuration which may be used to insert the phantom pulses and gate them out prior to transmission is shown in FIG. 5. In addition to the elements in the configuration shown in FIG. 1a (note that the power supplies are not shown in FIG. 5), the configuration of an embodiment of the present invention includes adding a pin diode switch 36, adding a pin diode driver 38, and replacing the gating switches 18 in FIG. 1a with inhibiting pin diodes 40 and an inhibiting pin diode driver 42.

The adding pin diode 36 selectively modulates the RF pulse width or adds synthetic or phantom pulses. The inhibiting pin diodes 40 remove the additional width or pulses form the RF signal being transmitted. In the particular configuration shown in FIG. 5, a programmable logic device 44 is implemented to add a variable amount of additional RF pulse at the end of each pulse of the coherent processing interval, i.e., the pattern shown in FIG. 3c.

For this purpose, the programmable logic device 44 includes an N-bit counter 46 receiving a start of pattern trigger signal and a range cell clock signal. A pulse number counter 48 also receives the start of pattern trigger signal and the range cell clock signal.

The N-bit counter 46 outputs N signals to each of the K pulse decoders 50, where K is the number of pulses in the coherent processing interval. The pulse decoders 50 output signals to an OR gate 52. As long as there is at least one signal output by the pulse decoders 50, the OR gate 52 outputs a signal to an adding pulse width modulator 54 and an inhibiting pulse width modulator 55. Each of the pulse width modulators 54, 55 also receives the range clock cell signal.

The pulse number counter 48 outputs M signals to a translation table 56. The translation table 56 determines a variable pulse width offset. The variable pulse width offset is output to an arithmetic unit 58, which in the configuration shown in FIG. 5 is a summation unit. The arithmetic unit 58 also receives a signal indicative of the minimum pulse width of the pattern. The arithmetic unit 58 outputs the sum of the minimum pulse widths and the variable pulse width offset to the adding pulse width modulator 54.

The adding pulse width modulator 54 is connected to an adding flip-flop 60, which also receives the range cell clock signal. The adding flip-flop 60 outputs a control signal in accordance with the synthetic pulse modulation gates along line 62 to the adding pin diode driver 38.

The inhibiting pulse width modulator 55 also receives the minimum pulse width signal. The inhibiting pulse width modulator 55 is connected to an inhibiting flip-flop 61, which also receives the range cell clock signal. The inhibiting flip-flop 61 outputs a control signal in accordance with the transmit inhibit gate along line 64 to the inhibiting pin diode driver 42.

It is evident that by altering quantity provided by the translation table 56 to the arithmetic unit 58 permits implementation of all of the insertions shown in FIGS. 3a–3c.

The techniques of the present invention are independent of the transmitter RF frequency.

Stability under staggered pulse conditions will become more important in the future as more information is required from radar systems, i.e., less range/doppler ambiguity, more clutter rejection, etc. The present invention simply and inexpensively provides such desired stability.

The invention being thus described, it will be obvious that the same may be varied in many ways. For example, the PIN diodes in FIG. 5 many be replaced with any RF gate. Such variations are not to be regarded as a departure from the spirit and scope of the invention, in all such modifications as would be obvious to one skilled in the art are intended to be included in the scope of the following claims.

What is claimed is:

1. A transmitter comprising:

means for receiving a staggered pulse train; and means for maintaining a constant temperature at a start of each pulse in the pulse train including means for inserting a false pulse between staggered pulses of the pulse train; and a gate which eliminates said false pulse from the pulse train output by the transmitter.

2. The transmitter as recited in claim 1, wherein said maintaining means further comprises means for determining cooler pulses in said staggered pulse train and means for inserting a false pulse of said false pulses before each of said cooler pulses in the pulse train.

3. The transmitter as recited in claim 1, wherein said maintaining means further comprises means for determining hotter pulses in said staggered pulse train and means for inserting a false pulse of said false pulses after each of said hotter pulses in the pulse train.

4. The transmitter as recited in claim 1, wherein said inserting means inserts a false pulse of said false pulses halfway between a pair of staggered pulses.

5. A method for increasing stability of a transmitter operating in a staggered mode comprising:

receiving a staggered pulse train;

maintaining a constant starting temperature of each pulse in the pulse train including inserting a false pulse between staggered pulses in the pulse train; and gating out said false pulse prior to outputting the pulse train from the transmitter.

6. The method as recited in claim 5, wherein said maintaining further comprises means for determining cooler pulses in said staggered pulse train and inserting a false pulse of said false pulses before each of said cooler pulses in the pulse train.

7. The method as recited in claim 5, wherein said maintaining further comprises determining hotter pulses in said staggered pulse train and inserting a false pulse of said false pulses after each of said hotter pulses in the pulse train.

8. The transmitter as recited in claim 5, wherein said inserting includes inserting a false pulse of said false pulses halfway between a pair of staggered pulses.

\* \* \* \* \*